March 1, 1960  B. R. TEGGE ET AL  2,927,101
LIQUID-LIQUID HEAT EXCHANGE IN LOW TEMPERATURE POLYMERIZATION
Filed Oct. 5, 1954  2 Sheets-Sheet 1
FIG. I
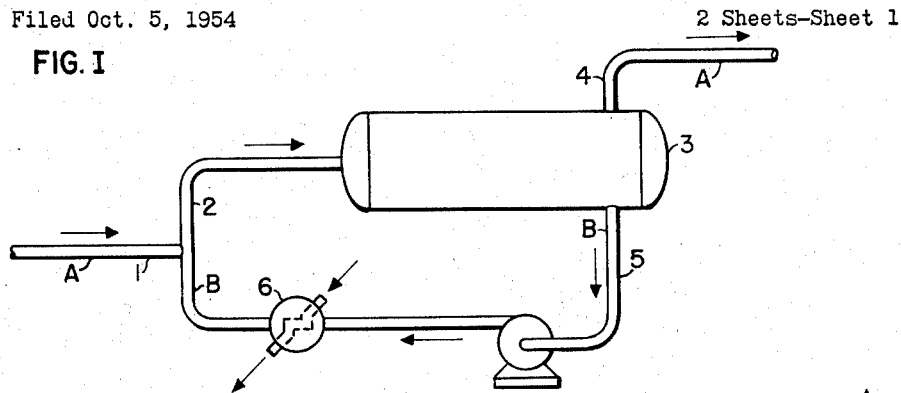
FIG. II
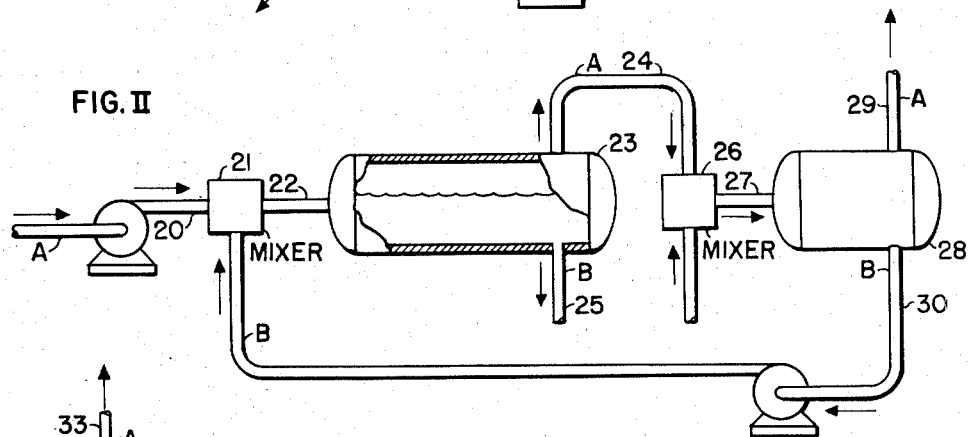
FIG. III
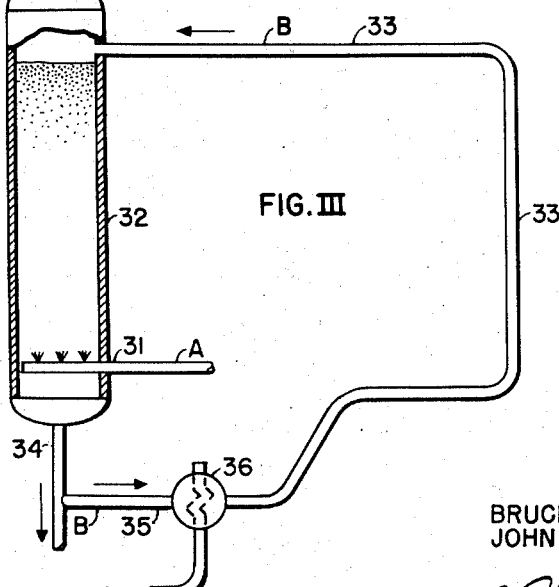
BRUCE R. TEGGE
JOHN L. ERNST    INVENTORS
By                Attorney

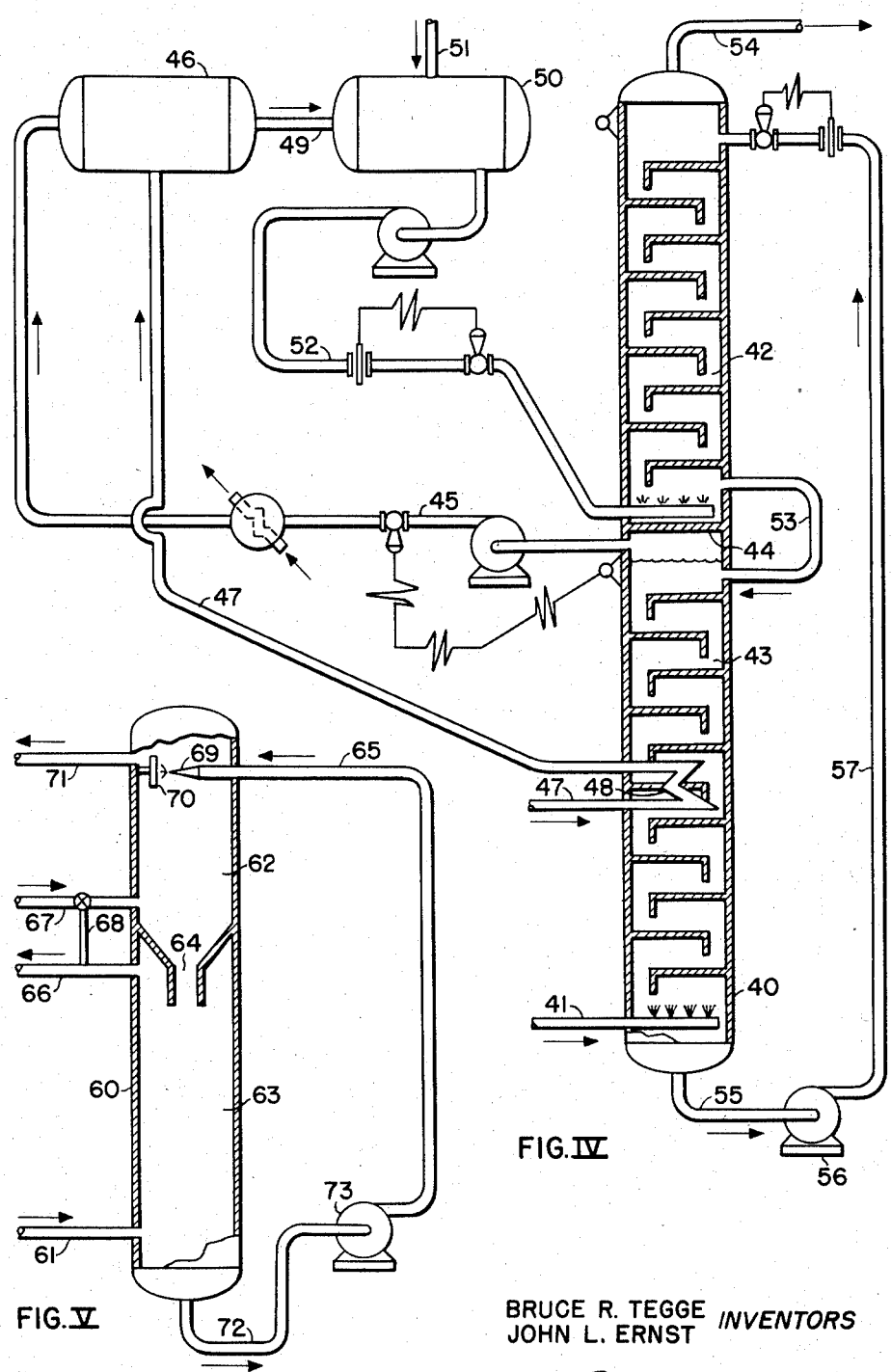

2,927,101

LIQUID-LIQUID HEAT EXCHANGE IN LOW TEMPERATURE POLYMERIZATION

Bruce R. Tegge, Chatham, and John L. Ernst, Westfield, N.J., assignors to Esso Research and Engineering Company, a corporation of Delaware Application October 5, 1954, Serial No. 460,410

6 Claims. (Cl. 260—85.3)

The present invention is concerned with an improved process for the production of polymers by low temperature polymerization processes and is more particularly concerned with an arrangement and sequence of heat exchanging stages by which improved efficiency in the exchange of heat is secured.

In accordance with the present process at least one immiscible or partly miscible liquid heat exchange medium is circulated between the incoming polymer feed and the outgoing product stream under conditions to secure direct contact between the circulating heat exchange medium and the feed stream and product stream. The preferred modification of the present invention comprises combining the two stages of cooling the feed and heating the product in one tower with the liquid heat exchange medium moving downward by gravity and being continuously removed from the bottom of the tower and returned to the top. It is a further feature of the invention that the immiscible or partly miscible liquid may be one that is liquid only under normal temperatures but is a solid during one stage at lower temperatures. Suitable liquid heat exchange media include low molecular weight perfluorinated hydrocarbons, mercury and carbon dioxide.

By operating in accordance with the present invention, unexpectedly desirable results are secured and the efficiency of the operation is materially improved.

It is well known in the art to carry out polymerization reactions at temperatures as low as —100° C. to —150° C. or lower. In such cases the feed materials must be indirectly contacted with a cold heat exchange fluid such as liquid ethylene, and the like. The preparation of butyl rubber by the copolymerization of a major amount of isobutylene and a minor amount of isoprene is an example of such low temperature reactions. Recent improvements in this process involves the use of a large volume of solvent for dissolving the polymer product. By forming the polymer in solution, reactor fouling problems are greatly reduced or eliminated. However, the solution is quite viscous even with low concentrations of polymer. Since heat exchange efficiency varies inversely with the solution viscosity, efficient indirect heat exchange between reactor feed and liquid product solution results in increased heat exchange size and cost.

An improved process for transferring refrigeration from the chilled product streams to the incoming feed streams has now been found. In accordance with the present invention, an immiscible or partly miscible liquid heat transfer medium is used to transfer refrigeration between the respective streams in an efficient manner. In this process the expensive indirect heat exchangers are replaced by continuous, regenerative heat exchangers which are based on the direct contacting of two immiscible or only partly miscible liquids in one or more stages. For example, the contacting may be conducted in a drum in which the cold reactor effluent is contacted with a large amount of warm immiscible liquid. The mixture is then allowed to settle and the heat exchange fluid is drawn off, heated and contacted with more reactor effluent.

Another embodiment consists in carrying out the heat exchange in two stages. In the first stage the reactor effluent is heated part way to the desired temperature by contacting it with a heat exchange fluid in a first zone and then to the final desired temperature by contacting it with the same or different liquid at a higher temperature.

A third embodiment consists in the use of a liquid-liquid countercurrent tower. This arrangement is the most efficient and consists in introducing the reactor effluent at one end of the tower and the heat exchange medium at the other and drawing off each at the opposite end of the tower from which they were introduced.

A modification of this last embodiment consists in the use of a body of liquid moving downward countercurrent to the flow of a body of another liquid moving upward in two stages. In the first stage a reactant liquid is heated from low temperatures up to approximately room temperature at the same time cooling a liquid heat exchange medium to nearly the original liquid temperature. In the second stage the cold liquid heat exchange medium is used for cooling the reactor feed from room temperature.

A still further embodiment consists in the use of a heat exchange material which is solid during one portion of the heat exchange cycle and liquid during another portion of this cycle. This arrangement consists in pumping liquid mercury or carbon dioxide through a nozzle in the tower in which cold reactor effluent is being processed causing the mercury or carbon dioxide to solidify in small spherical particles as it falls through the reactor liquid. The cold spheres then fall into a tower through which the warm feed to the reactor is flowing whereupon the warm feed is cooled as they melt. The liquid mercury or carbon dioxide is then pumped from the bottom of this tower back to the tower containing the cold reactor effluent.

For a further understanding of the invention, reference may be had to the accompanying drawings in which:

Figure 1 is a schematic diagram of one method for carrying out the invention.

Figure 2 represents another embodiment of the invention in which the heat exchange is carried out in two stages.

Figure 3 represents still another embodiment of the invention in which the heat exchange is carried out in a liquid-liquid countercurrent tower.

Figure 4 represents another embodiment of the invention in which the reactor effluent is heat exchanged in a countercurrent tower with the warm feed through the medium of an immiscible or only partly miscible liquid.

Figure 5 represents an embodiment of the invention in which the reactor effluent is heat exchanged with a liquid which solidifies upon contact with the cold effluent and melts upon contact with the warm feed.

Referring now to Figure 1, a cold liquid A at a temperature of —100° F. is passed by line 1 to line 2 containing a flowing liquid B having a temperature of about 220° F. The flowing liquid is preferably a liquid which is immiscible or only partly miscible with the cold liquid to be brought to a higher temperature.

The enthalpy ratio of liquids flowing in lines 1 and 2 is such that the temperature of the mixed liquids is about 200° F. The mixture flows into tank 3 where the mixture is settled and liquid A at 200° F. is drawn off by line 4. Liquid B also at 200° F. is drawn off through line 5 and pumped through indirect heat exchanger 6 where it is again heated to 220° F. Thus heated it is mixed with fresh feed at —100° C. introduced through line 1 and again passed through line 2 to vessel 3.

Figure 2 shows a two-stage heat exchange arrangement. According to this embodiment liquid A at −100° F. is pumped by line 20 into mixing zone 21 where it contacts a sufficient amount of immiscible liquid B at +100° F. such that the mixture is heat exchanged to a temperature of 0° F. The mixture flows by line 22 to tank 23 where the mixture settles and liquid A at 0° F. is drawn off by line 24 and liquid B also at 0° F. is withdrawn by line 25. Liquid A flowing in line 24 is passed to mixer 26 where it contacts a sufficient quantity of the same or other immiscible liquid at a temperature of 200° F. so that the mixture has a temperature of +100° F. The mixture is passed by line 27 to drum 28 where it is settled and liquid A is withdrawn by line 29. Liquid B at +100° F. is withdrawn by line 30 and pumped back into mixing zone 21.

In Figure 3, liquid A at a temperature of −100° F. is introduced by line 31 into the bottom of tower 32. Tower 32 is suitably a packed tower or other conventional liquid-liquid contacting tower. Liquid B at 105° F. is introduced at the top of tower 32 by line 33 and passes down the tower countercurrent to liquid A. Liquid A at 100° F. is withdrawn by line 33 and liquid B at −95° F. by line 34. If desired, liquid B may be passed by line 35 to indirect heat exchangers 36 where it is warmed to 105° F. and then recycled to the top of tower 32 by line 33.

Figure 4 illustrates an embodiment of the invention in which a cold reactor effluent is warmed and warm feed is cooled by the use of a third immiscible liquid in a single tower. In this embodiment a feed mixture at 110° F. consisting of 2.5 wt. percent isoprene and 97.5 wt. percent isobutylene and a hydrocarbon diluent having from 4 to 8 carbon atoms, e.g. hexane, is introduced into the bottom of a liquid-liquid contacting tower 40 by line 41. Tower 40 is separated into a top section 42 and a bottom section 43. The top and bottom sections are separated by a partition 44. The feed passes countercurrently to a downwardly flowing immiscible liquid, e.g. perfluoroethane, introduced at the top of the tower. Cold feed at about −114° F. is drawn off below partition 44 through line 45 and fed to reactor 46. Catalyst, e.g. aluminum bromide dissolved in hexane at +100° F., is fed into reactor 46 through line 47 and heat exchanger 48 placed in the lower section 43 of tower 40, where it is cooled to −100° F. Effluent polymer solution is drawn off reactor 46 by line 49 and passed to catalyst deactivating zone 50 where the catalyst is destroyed by the addition of ammonia or other quenching agent by line 51. Quenched cold effluent is introduced by line 52 into the middle of tower 40 just above partition 44 where it contacts relatively warm perfluoroethane flowing down the tower. The perfluoroethane is cooled to −114° F. by contact with the cold reactor effluent and passes by line 53 from section 42 to section 43 of the tower 40 where it contacts fresh feed at +110° F. A dilute solution of polymer containing about 5 wt. percent of polymer in hexane leaves the top of tower 40 at a temperature of 107° F. through line 54. Perfluoroethane is withdrawn from the bottom of tower 40 through line 55 and passes by pump 56 to the top of the tower through line 57.

Figure 5 illustrates an embodiment of the invention in which a heat exchange medium is used which is solid at the temperature of one fluid and liquid at the temperature of the other. In this embodiment a feed mixture at 110° F. similar to that of Figure 4 is introduced into the bottom of contacting tower 60 by line 61. Tower 60 is separated into a top section 62 and a bottom section 63, separated by conical-necked down section 64. The feed passes upwardly countercurrent to a downwardly flowing heat exchange medium such as mercury or carbon dioxide introduced as a liquid at the top of the tower by line 65.

Cold reactor effluent is introduced to section 62 of tower 60 by line 67 and substantially fills the tower. Control valve 68 is connected across lines 66 and 67 so that a small amount of feed flowing in line 68 is allowed to by-pass into the reacted liquid in order to provide adequate liquid seal in the middle of the tower. This results in a pressure drop across necked-down section 64 and prevents excessive intermixing of cold feed and cold reacted liquid.

Liquid mercury or carbon dioxide enters tower 60 through line 65 and atomization nozzle 69 which is submerged in the cold reactor effluent filling section 62 of tower 60. The temperature of the cold reactor effluent is about −110° F. and is sufficient to solidify the liquid mercury or carbon dioxide into small spherical particles which fall through the cold effluent reactor liquid. The cold spheres finally fall through necked-down section 64 into section 63 where they contact warm feed filling section 63 where they melt and cool the warm feed. Cold feed at about −100° F. is drawn off below necked-down section 64 through line 66, while warm reactor effluent is withdrawn through line 71. Liquid mercury or carbon dioxide is withdrawn from the bottom of section 63 through line 72 and passed by pump 73 and line 65 to the top of section 62 of tower 60.

The nature of the present invention having been thus fully set forth and specific examples of the same given, what is claimed as new and useful and desired to be secured by Letters Patent is:

1. In the process for preparing butyl rubber by co-polymerizing a feed stream, said feed stream comprising a major proportion of isobutylene and a minor proportion of isoprene, at a temperature below −100° F. in the presence of a liquid hydrocarbon of 4 to 8 carbon atoms, wherein the butyl rubber is obtained as a solution in said hydrocarbon and wherein the liquid feed stream is cooled by heat exchange with the cold solution of butyl rubber, the improvement which comprises directly contacting the solution of butyl rubber at a temperature below −100° F. with a moving body of a transfer medium which is solid under one set of conditions and liquid under another and which transfer medium is chosen from the group consisting of mercury and carbon dioxide, whereby said heat exchange medium is chilled and solidified and said cold solution of butyl rubber is warmed, separating said warm solution of butyl rubber from said chilled solid heat exchange medium, then contacting said liquid feed stream with said chilled solid heat exchange medium whereby the said liquid feed stream is chilled to below −100° F. and said solid heat exchange medium is warmed and liquified, separating said chilled liquid feed stream from said liquified heat exchange medium, and recycling the said liquid heat exchange medium to contact with the said cold solution of butyl rubber.

2. Process according to claim 1 in which the heat transfer medium is mercury.

3. Process according to claim 1 in which the heat transfer medium is carbon dioxide.

4. In a process for preparing butyl rubber by copolymerizing a feed stream, said feed stream comprising a major proportion of isobutylene and a minor proportion of isoprene, at a temperature below −100° F. in the presence of a liquid hydrocarbon of 4 to 8 carbon atoms, wherein the butyl rubber is obtained as a solution in said hydrocarbon and wherein the liquid feed stream is cooled by heat exchange with the cold solution of butyl rubber, the improvement which comprises maintaining a downwardly moving body of a heat transfer medium, which is solid under one set of conditions and liquid under another and which is chosen from the group consisting of mercury and carbon dioxide, in a heat exchange zone, having an upper section and a lower section connected thereto, introducing warm liquid heat transfer medium into the top of said upper section, withdrawing warm liquid heat transfer medium from the bottom of said lower section and returning said heat transfer medium to the top of said upper section, introducing said cold solution of butyl rubber into the bottom of said upper section countercurrent to said moving bed of liquid heat transfer medium wherein said solution of butyl rubber is warmed and said liquid heat transfer medium is chilled and solidified, separating said solid heat transfer medium from said warm solution of butyl rubber and passing it from said upper section to said lower section, simultaneously introducing the incoming liquid feed stream into the bottom of said lower section countercurrent to said cold solid heat transfer medium, and separating and withdrawing warm solution of butyl rubber from the top of said upper section and separating and withdrawing cold liquid feed from the top of said lower section.

5. Process according to claim 4 in which the heat transfer medium is mercury.

6. Process according to claim 4 in which the heat transfer medium is carbon dioxide.

References Cited in the file of this patent
UNITED STATES PATENTS

| | | |
|---|---|---|
| 1,724,513 | Pollitzer | Aug. 13, 1929 |
| 2,405,480 | Wilde | Aug. 6, 1946 |
| 2,455,665 | Ford et al. | Dec. 7, 1948 |
| 2,561,226 | Powers | July 17, 1951 |
| 2,580,019 | Gould et al. | Dec. 25, 1951 |
| 2,607,763 | Hipkin et al. | Aug. 19, 1952 |
| 2,643,527 | Keith | June 30, 1953 |